United States Patent [19]

Inoue

[11] Patent Number: 4,882,949

[45] Date of Patent: Nov. 28, 1989

[54] DIFFERENTIAL FOR A MOTOR VEHICLE

[75] Inventor: Takeo Inoue, Tokyo, Japan

[73] Assignee: Fuji Jukogyo Kabushiki Kaisha, Tokyo, Japan

[21] Appl. No.: 257,990

[22] Filed: Oct. 13, 1988

[30] Foreign Application Priority Data

Oct. 15, 1987 [JP] Japan .................................. 62-260978

[51] Int. Cl.$^4$ ............................................. F16H 1/44
[52] U.S. Cl. ........................................ 74/714; 74/710; 74/711
[58] Field of Search .................. 74/714, 710, 711, 803

[56] References Cited

U.S. PATENT DOCUMENTS

| | | | |
|---|---|---|---|
| 2,788,679 | 4/1957 | Mott | 74/714 |
| 2,791,919 | 5/1957 | Wildhaber | 74/714 |
| 3,420,121 | 1/1969 | Stieg | 74/714 |
| 3,494,226 | 2/1970 | Biddle | 74/714 |
| 4,535,651 | 8/1985 | Chambers | 74/711 |

FOREIGN PATENT DOCUMENTS 497028 12/1938 United Kingdom .................. 74/711

Primary Examiner—Rodney H. Bonck
Assistant Examiner—William Gehris
Attorney, Agent, or Firm—Martin A. Farber

[57] ABSTRACT

A differential for a motor vehicle is locked in straight-ahead driving. The differential has a pair of output shafts rotatably supported and inserted into a cylindrical differential case, and a pair of carriers provided in the differential case and secured to the output shafts respectively. A pair of annular side gears are securely provided in the differential case, and an annular center gear is rotatably mounted in the differential case between the side gears. A pair of planetary gears are rotatably supported in the corresponding carrier. Each planetary gear comprises a pair of planetary pinions, one of which is engaged with the side gear and the other is engaged with the center gear. The gear ratio between one of the planetary pinion and the center gear is different from the gear ratio of the other planetary pinion and the center gear. For example if the numbers of teeth of both side gears are $S_1$ and $S_2$, the numbers of teeth of gears of the center gears are $C_1$ and $C_2$, the numbers of teeth of the planetary pinions for one of the output shafts are $P_1$ and $P'_1$ and the numbers of teeth of the planetary pinions for the other output shaft are $P_2$ and $P'_2$. $(S_1 \cdot P'_1/C_1 \cdot P_1)+(S_2 \cdot P'_2/C_2 \cdot P_2) \approx 2$.

8 Claims, 2 Drawing Sheets

DIFFERENTIAL FOR A MOTOR VEHICLE

BACKGROUND OF THE INVENTION

The present invention relates to a differential provided in a final reduction device of a power transmission system for a motor vehicle or a central differential provided in a four-wheel drive motor vehicle.

In an automobile, a differential is provided between axles of drive wheels for permitting one of the drive wheels to turn at a different speed from the other wheel, while power of an engine is transmitted from a drive shaft to the drive wheel axles.

In brief, the differential comprises a differential case, encasing two differential pinion gears and two bevel side gears meshed with pinion gears, and internally splined to drive wheel axles, and a ring gear attached to the case and engaged with a drive pinion. The differential operation is performed in accordance with the speed difference of the drive wheels caused by the difference of coefficient of friction of a road, even if the motor vehicle is travelling straight ahead which causes one wheel to turn faster than the other.

In order to avoid such a defect, nonslip differentials are used in many automobiles, in which two sets of clutch plates are provided for locking the drive wheel axles to the case. However, the structure of such a differential is complicated.

Japanese Utility Model Application Laid-Open 61-123250 discloses a system for controlling a differential comprising a worm gear and a worm wheel for permitting the differential operation when a motor vehicle makes a turn. When the vehicle travels on a straight road, the differential is in inoperative state because of the irreversible function of the worm gear.

However, in such a system, since the worm gear is used, the structure of the differential is complicated so that the manufacturing cost increases. Further, since the worm gear device has a large sliding resistance, the transmission efficiency is reduced and wearing of the gears increases.

SUMMARY OF THE INVENTION

The object of the present invention is to provide a system which is simple in structure and improved in operability.

According to the present invention, there is provided a differential for a motor vehicle comprising a rotatably supported differential case, a pair of output shafts rotatably supported and inserted into the differential case, a pair of carriers provided in the differential case and secured to the output shafts respectively, a pair of annular side gears securely provided in the differential case, and an annular center gear rotatably mounted in the differential case, a pair of planetary gears, each comprising a pair of planetary pinions and rotatably supported in one of the carriers, one of the planetary pinions of each planetary gear being engaged with a respective side gear and the other planetary pinions being engaged with the center gear. In an aspect of the invention the gear ratio between one of the planetary pinions and the center gear is different from the gear ratio of another other planetary pinion and the center gear.

In an aspect of the invention, if the numbers of teeth of both side gears are $S_1$ and $S_2$, the numbers of teeth of gears of the center gears are $C_1$ and $C_2$, the numbers of teeth of planetary pinions of one of the planetary gears for one of the output shafts are $P_1$ and $P'_1$ and the numbers of teeth of planetary pinions of the other planetary gear for the other output shaft are $P_2$ and $P'_2$, $(S_1 \cdot P'_1 / C_1 \cdot P_1) + (S_2 \cdot P'_2 / C_2 \cdot P_2) \approx 2$.

The other objects and features of this invention will become understood from the following description with reference to the accompanying drawings.

DETAILED DESCRIPTION OF THE PREFERRED EMBODIMENT

Figure 1:
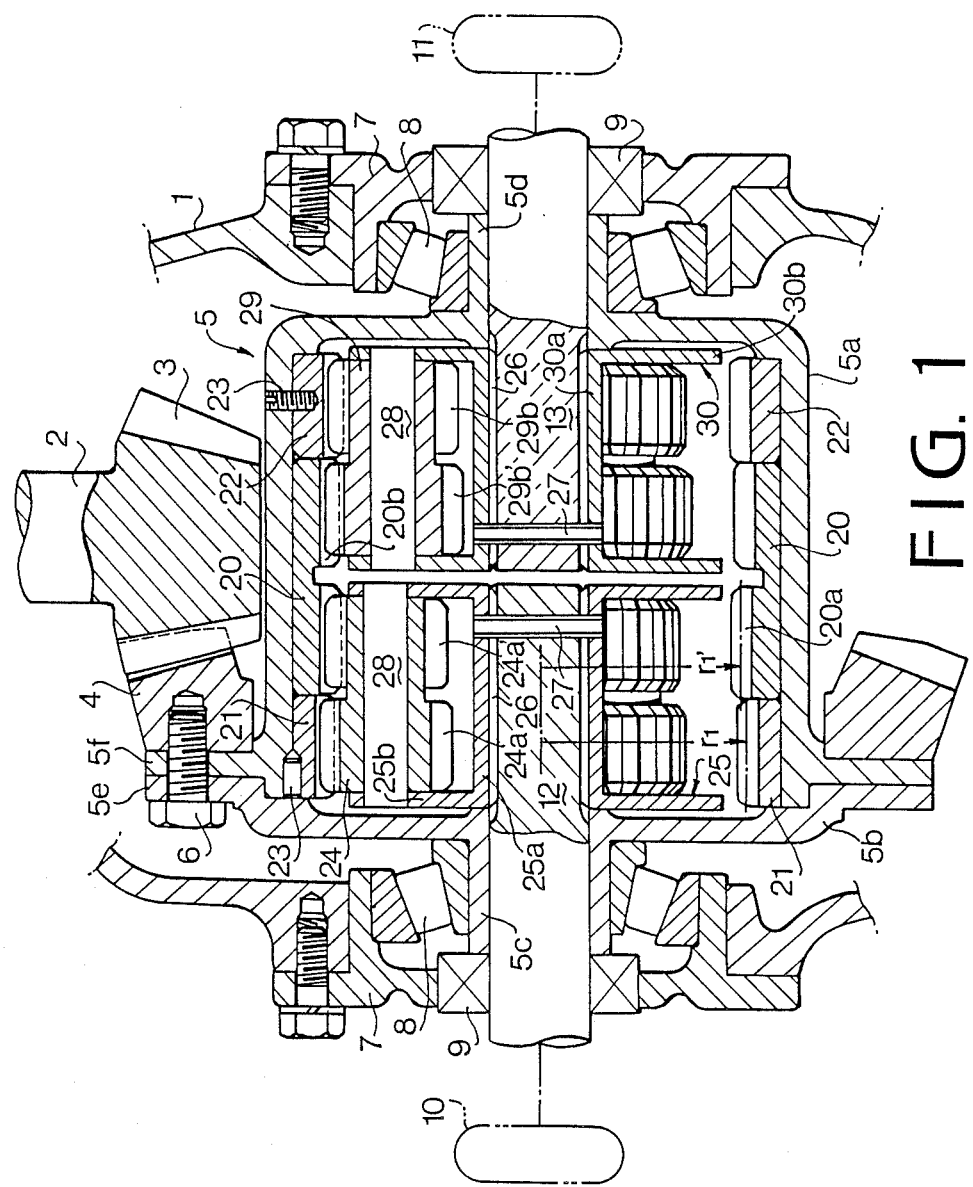
FIG. 1 is a sectional view of a differential according to the present invention.
Figure 2:
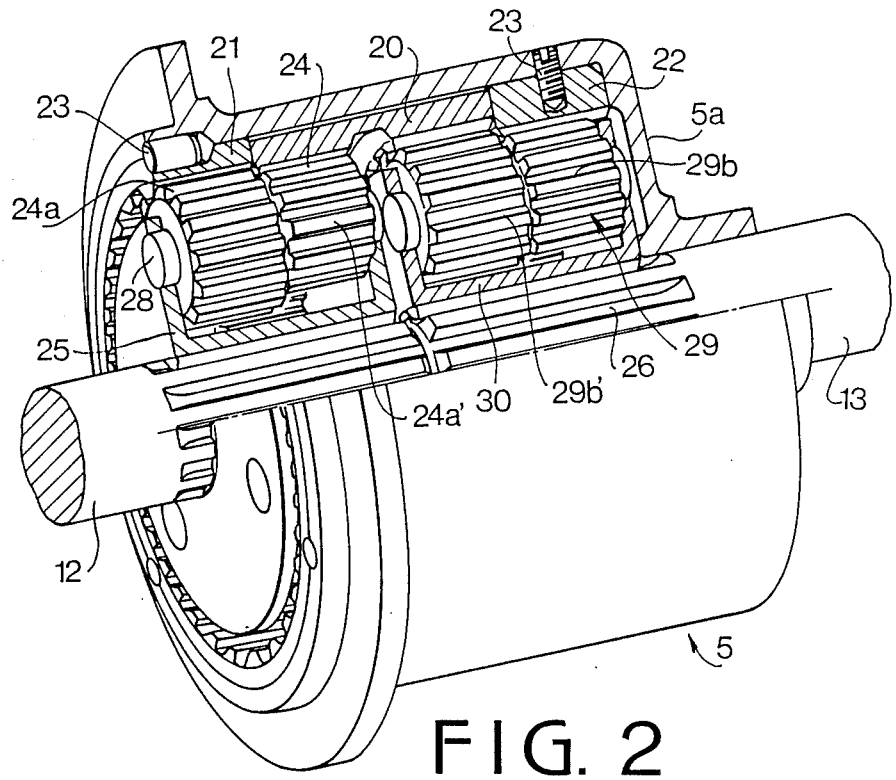
FIG. 2 is a perspective view of the differential partly shown by a cutaway view.

Referring to FIGS. 1 and 2, a differential housed in a differential carrier 1 comprises a differential case 5, a ring gear 4 attached to the case 5 by bolts 6 at a flange 5f. A drive pinion 3 at an end of a drive shaft 2 is engaged with the ring gear 4 for transmitting the power of an engine to the differential.

The differential case 5 comprises a cylindrical body 5a and a side disk plate 5b secured to the body 5a by bolts 6 at their flanges 5e and 5f. Hubs 5c and 5d formed on the side plate 5b and the body 5a are rotatably mounted on bearings 8, 8 provided in bearing cases 7 secured to the differential carrier 1. Drive wheel axles (output shafts) 12 and 13 connected to drive wheels 10 and 11 are rotatably mounted in hubs 5c and 5d and sealed by oil seals 9.

In the case 5, an annular center gear 20 is rotatably mounted on an inner wall of the cylindrical body 5a. The center gear 20 has a pair of internal gears 20a and 20b, which are different from each other in number of teeth. A pair of annular side gears 21 and 22 are disposed opposite sides of the center gear 20 and secured to the cylindrical body 5a by pins 23, respectively. The number of teeth of the side gear 21 is different from the number of teeth of the side gear 22. A pair of carriers 25 and 30 are secured to the axles 12 and 13 by spring pins 27 at cylindrical portion 25a and 30a and serrated portions 26 of the axles 12 and 13, respectively. The carriers 25 and 30 have opposite carrier plates 25b and 30b to which shafts 28 are secured by force fit. A double planet gear 24 is rotatably mounted on one of the shafts 28. The planet gear 24 has an outer planet pinion 24a meshed with the side gear 21 and an inner planet pinion 24a' meshed with the gear 20a of the center gear 20. The planet pinions 24a and 24a' are different from each other in number of teeth. Three planet gears 24 carried by the carrier 25 are circumferentially disposed in the cylindrical body 5a at equidistant positions.

Similarly, a double planet gear 29 is rotatably mounted on the shaft 28. The planet gear 29 has planet pinions 29b and 29b' which are engaged with the side gear 22 and the gear 20b of the center gear 20, respectively. The pinions 29b, 29b' are also different from each other in number of teeth.

For differential operation, the structure of the gear train of the present invention has the following relation. When the vehicle goes around the corner, the inner and outer driving wheels with respect to the corner rotate in opposite directions by the same amount about the differential, respectively.

When the carriers 25 and 30 are rotated one revolution, gear speeds $n_a$ and $n_b$ of internal gears 20a and 20b of the center gear 20 is represented as follows.

$$n_a = 1 - (S_1 \cdot P_1 / C_1 \cdot P_1)$$

$$n_b = 1 - (S_2 \cdot P'_2 / C_2 \cdot P_2)$$

where $S_1$ is the number of teeth of the side gear 21, $C_1$ is the number of teeth of the gear 20a of the center gear 20, $P_1$ and $P'_1$ are the numbers of the teeth of the planet pinions 24a and 24a' of planet gear 24, $S_2$ is the number of teeth of the side gear 22, $C_2$ is the number of teeth of the gear 20b of center gear 20, and $P_2$ and $P'_2$ are the numbers of the teeth of planet pinions 29b and 29b' of planet gear 29.

Thus, when a difference between both the equations becomes zero, namely the gear speed $n_a$ equals the gear speed $n_b$ in the same direction, the differential operation is achieved. In that case, if the speed of the wheels rotated in the reverse direction is represented by the negative quantity, the above equations are expressed as follows.

$$-n_a - n_b =$$

$$(S_1 \cdot P_1 / C_1 \cdot P_1) + (S_2 \cdot P'_2 / C_2 \cdot P_2) = 2$$

Thus, the number of teeth of each gear is determined to satisfy the above equation.

On the other hand, when the vehicle drives on a straightaway, the gear train is operated to restrict the rotations of the gears. Namely, powers different in speed are applied to the center gear 20 through the differential case 5, side gears 21, 22 and planet gears 24, 29. Accordingly, the center gear 20 is unable to rotate so that the gear train goes in a non-differential state. Thus, the gears are integrated with the case 5 to equally transmit the power to the drive wheel axles 12 and 13.

Figure 3:
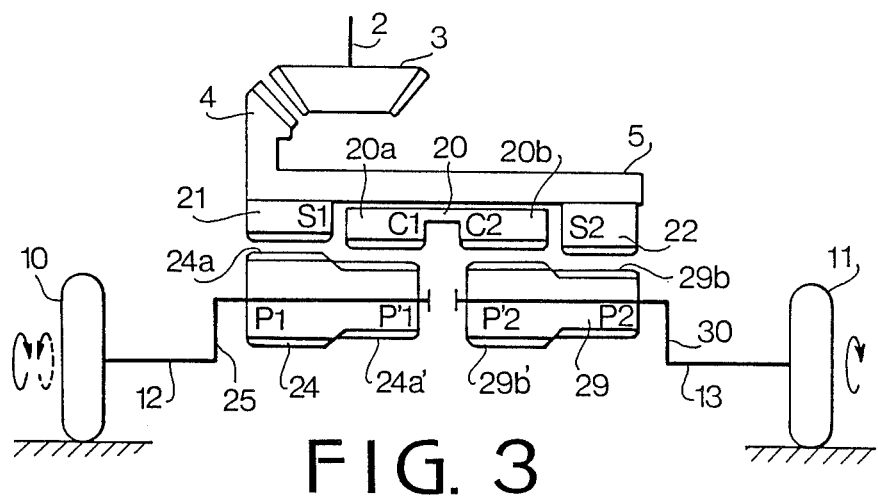
FIG. 3 is a schematic diagram showing an operation of gears in the differential.

Referring to FIG. 3 showing the differential operation. When the drive shaft 2 rotates, the drive pinion 3 rotates the ring gear 4 and hence the differential case 5, so that the side gears 21 and 22 rotate to rotate the planet gears 24 and 29.

When the vehicle turns to the left, the drive wheel 11 on the axle 13 is rotated in a direction (shown by an arrow), and the carrier 30 causes the planet pinion 29b of the planet gear 29 to revolve about the axle 13 and to rotate about the shaft 28. As a result, the internal gear 20b' causes the center gear 20 to rotate. If the rotating speed of the drive wheel 11 is $\Delta n$, the center gear speed is $\Delta n'_c$, gear ratio $K'$ is $K' = S_2 \cdot P'_2 / C_2 \cdot P_2$, and the center gear speed $\Delta n'_c$ is $$\Delta n'_c = (1 - K') \Delta n.$$

Similarly, the drive wheel 10 is rotated in the opposite direction with respect to the differential, and the planet gear 24 is rotated by the carrier 25 to rotate the center gear 20. If the wheel speed of the drive wheel 10 is $-\Delta n$, the center gear speed is $\Delta n_c$, gear ratio $K$ is $K = S_1 \cdot P'_1 / C_1 \cdot P_1$, and the center gear speed $\Delta n_c$ is $$\Delta n_c = -(1 - K) \Delta n.$$

Since it is determined that $K + K' = 2$, the equation is replaced as $\Delta n_c = (1 - K') \Delta n$. Thus, $\Delta n'_c = \Delta n_c$ is obtained, thereby providing a smooth differential operation.

In straightaway driving, each of the planet gears 24 and 29 is subjected to the rotational force of the differential case 5 through the side gears 21 and 22. However, the speeds of both planet gears which are applied to the center gear 20 are different from each other because of different gear ratios. Accordingly, the center gear cannot be rotated. Thus, the gear train is locked so that the axles 12 and 13 are integrally engaged with the differential case 5 and rotated together.

Furthermore, if the drive wheel 10, for example, is on a slippery road during driving of the vehicle, the carrier 25 attempts to spin with revolution and rotation of the planet gear 24. By the way, since the radii (r1, r1') of pitch circles of each planetary pinion (24a, 24a') are set slightly different from each other, the rotational force of the planet gear 24 caused by the difference of the radii (r1, r1') becomes substantially zero because of the existence of the sliding resistance between the planet gear 24 and the shaft 28. Accordingly, the revolution and rotation of the planet gear 24 are restricted.

Similarly, rotation of the carrier 25 is restricted, so that the power is transmitted to the drive wheel 11.

In accordance with the present invention, the differential operation is performed at cornering without restriction by friction. In straightaway driving, the differential is locked, so that driveability is improved.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A differential for a motor vehicle comprising:
   a rotatably supported differential case;
   a pair of output shafts rotatably supported and inserted into the differential case;
   a pair of carriers provided in the differential case and operatively connected to the output shafts respectively;
   a pair of annular side gears securely provided in the differential case;
   an annular center gear rotatably mounted in the differential case;
   a pair of planetary gears, each comprising a pair of planetary pinions and rotatably supported in a respective one of the carriers,
   One of the planetary pinions of each planetary gear being engaged with a respective side gear and the other planetary pinions being engaged with the center gear.

2. The differential according to claim 1, wherein the gear ratio between one of said other planetary pinions and the center gear is different from the gear ratio of the other of said other planetary pinions and the center gear.

3. The differential according to claim 2, wherein the center gear has a pair of gears engaged with said other planetary pinions respectively of said pair of planetary gears.

4. The differential according to claim 3, wherein numbers of teeth of both side gears are $S_1$ and $S_2$, numbers of teeth of the gears of the center gear are $C_1$ and $C_2$, numbers of teeth of the planetary pinions of one of the planetary gears for one of the output shafts are $P_1$ and $P'_1$ and numbers of teeth of the planetary pinions of the other planetary gear for the other output shaft are $P_2$ and $P'_2$, wherein $$(S_1 \cdot P'_1/C_1 \cdot P_1) + (S_2 \cdot P'_2/C_2 \cdot P_2) \approx 2.$$

5. The differential according to claim 3, wherein pitch circles of each of the planetary pinions of each of said planetary gears are slightly different in radius.

6. The differential according to claim 1, wherein said center gear is centrally disposed between and coaxially to said side gears.

7. The differential according to claim 1, wherein said gears are sized such that when said output shafts have the same speed when the motor vehicle is in straightaway driving, said other planetary gears tend to rotate said center gear with different speeds so all said gears are locked and said output shafts are integrally engaged with said differential case.

8. The differential according to claim 1, further comprising drive means for rotating said differential case.

* * * * *